United States Patent

Ward

[11] Patent Number: 5,227,190
[45] Date of Patent: Jul. 13, 1993

[54] LIVESTOCK FEED

[75] Inventor: Robert Ward, Amherst, Wis.

[73] Assignee: Tomorrow Valley Cooperative Services, Manawa, Wis.

[21] Appl. No.: 777,186

[22] Filed: Oct. 16, 1991

[51] Int. Cl.$^5$ .................... A23K 1/10; A23K 1/04
[52] U.S. Cl. ..................... 426/641; 426/302; 426/516; 426/524; 426/601; 426/623; 426/630; 426/646; 426/647; 426/807
[58] Field of Search ............. 426/601, 302, 641, 646, 426/647, 524, 454, 807, 517, 646, 307, 623, 630, 516

[56] References Cited

U.S. PATENT DOCUMENTS

| | | | |
|---|---|---|---|
| 2,945,764 | 7/1960 | Lanz | 426/302 X |
| 3,014,800 | 12/1961 | Guidarelli | 426/454 X |
| 4,104,407 | 8/1978 | Stringer et al. | 426/307 X |
| 4,225,630 | 9/1980 | Pitchon | 426/307 X |
| 4,729,899 | 3/1988 | Volk et al. | 426/307 |
| 4,861,606 | 8/1989 | Jensen | 426/307 X |

Primary Examiner—R. B. Penland
Attorney, Agent, or Firm—Jacobson, Price, Holman & Stern

[57] ABSTRACT

A livestock feed containing meat and bone, bloodmeal, soy hulls, corn and about 20% by weight liquid animal fat. The invention further relates to a process for making a livestock feed including the steps of mixing together meat and bone, bloodmeal, soy hulls, corn and a first portion of liquid animal fat; extruding the mixture into pellets; and then spraying the extruded pellets with a second portion of liquid animal rat. All of the fat used in the livestock feed and in the process for making the livestock feed is liquid animal fat.

7 Claims, No Drawings

LIVESTOCK FEED

BACKGROUND OF THE INVENTION

1. Field of the Invention

The present invention relates to a livestock feed and the process for making the livestock feed. Specifically, the present invention relates to a dairy cattle feed containing meat and bone, bloodmeal, liquid animal fat, soy hulls and corn.

2. Prior Art

For years, different blends and processes have been tried in an attempt to create new types of feed for dairy cattle that are excellent nutritional blends and are available at an extremely competitive price.

An important ingredient needed in a cattle feed is animal fat. Attempts have been made to use liquid animal fat that will properly pelletize which is much easier to handle and results in savings when producing the feed.

U.S. Pat. No. 4,225,630 points out that the addition of fat to an extruder-expanded farinaceous pet food beyond a level of 6 or 8% is replete with difficulties. According to the process as described in U.S. Pat. No. 4,225,630, the fat is injected into an extruder after the farinaceous and proteinaceous ingredients have been blended and subjected to elevated heat and pressure.

U.S. Pat. No. 2,945,764 describes a process for producing animal feed using the pressure of the extrusion process to heat the mixture and then drying the pellets after extrusion. The pellets are placed in a tumbler drum for further drying and then a hot liquid fat is sprayed on the pellets while still hot. However, this patent only mentions being able to produce pellets with a 10% by weight fat content.

U.S. Pat. No. 3,014,800 also discloses first forming the pellets and then spraying the product while still hot with liquid fat. The sprayed pellets are then held at an elevated temperature to permit absorption of the fat prior to cooling. This patent is able to produce a product with up to about 20% by weight fat content.

SUMMARY OF THE INVENTION

The present invention provides a livestock feed comprising approximately 35-42% by weight of meat and bone, 4-6% by weight of bloodmeal, 12-17% by weight of soy hulls, 18-22% by weight of corn and 19-20% by weight of liquid animal fat, all weight percentages being based on the total weight of the livestock feed. Preferably, the livestock feed comprises about 40% by weight of meat and bone, about 5% by weight of bloodmeal, about 15% by weight of soy hulls, about 20% by weight of corn and about 20% by weight of liquid animal fat. All of the fat used to produce the inventive livestock feed is in liquid form.

The process for producing a livestock feed comprises first mixing together the above-listed ingredients except for about one quarter of the liquid animal fat. The mixed ingredients are then introduced into an extruder, whereby the mixture is heated to about 300° F. by the friction and pressure of the extruder. The heated mixture is extruded through a die thereby producing pellets. The pellets are sprayed with the remaining liquid animal fat not included in the first step and, lastly, the sprayed pellets are cooled.

In the preferred embodiment, the livestock feed comprises approximately 750-850 pounds of meat and bone, 75-125 pounds of bloodmeal, 275-325 pounds of soy hulls, 400-450 pounds of corn and 400-410 pounds of liquid animal fat.

A preferred process for producing a livestock feed comprises first mixing together approximately 800 pounds of meat and bone, 100 pounds of bloodmeal, 300 pounds of soy hulls, 400 pounds of corn and 300 pounds of liquid animal fat. The resultant mixture is then introduced into an extruder, whereby the extruder uses friction and pressure to heat the mixture to approximately 300° F. The heated mixture is extruded through a die thereby producing pellets. The pellets are sprayed with an additional 100 pounds of liquid animal fat not mixed in the first step and lastly the sprayed pellets are cooled for about 20 to 25 minutes.

The present invention achieves a much higher liquid animal fat content in the livestock feed of about 20% by weight.

Other features of the invention and the advantages thereof will become apparent from the detailed description below.

DETAILED DESCRIPTION OF THE INVENTION

The invention will now be described in detail with reference to the following formula which is the preferred formulation of the invention.

The ingredients for the product are as follows:
- about 800 pounds of meat and bone
- about 100 pounds of bloodmeal
- about 300 pounds of soy hulls
- about 400 pounds of corn
- about 400 pounds of liquid animal fat All but about 100 pounds of the liquid fat are mixed in bulk. Then, the mixed ingredients are conveyed into a hopper. From the hopper, the ingredients are introduced into a single-screw extruder. The extruder uses friction and pressure to heat the mixture to approximately 300 degrees. At the end of the extruder is a die that is 5/16 of an inch in diameter. As the mixture leaves the die, the additional 100 pounds of liquid animal fat are sprayed on the pellets. After that process occurs, the mixed product drops to a conveyor and is lifted up to the steeping bin. The steeping bin is 30 feet long. The product travels across the bin for approximately 20 to 25 minutes via a chain drive. After traveling across the steeping bin, the pellets are approximately 100° F. when they are dropped into a storage bin. From there, the product is then immediately ready for shipment to the farms.

The process of the present invention removes the smell and taste of the meat products which makes the feed much more attractive to cattle who are vegetarians. Furthermore, the process eliminates the risk of salmonella poisoning and other storage problems which occur in other animal by-product dairy feeds. This factor also makes the present invention more attractive. A further advantage of the present invention is that by being able to add all of the animal fat ingredient in liquid form, rather than dry form, a considerable cost savings is realized.

The foregoing description of the invention has been made with references with a few preferred embodiments. Persons skilled in the art will understand that changes and modifications can be made in the invention without departing from the spirit of the invention as described above and the scope of the appended claims.

What is claimed is:

1. A process for producing cattle feed consisting essentially of the steps of:
   (a) providing cattle feed ingredients comprising, based on the total weight of said cattle feed ingredients, about 35-42% by weight meat and bone, about 4-6% by weight bloodmeal, about 12-17% by weight soy hulls, about 18-22% by weight corn, and about 19-20% by weight liquid animal fat;
   (b) mixing together all of said cattle feed ingredients except about a 25% portion of the liquid animal fat;
   (c) introducing the mixture from step (b) into an extruder, whereby the friction and pressure of said extruder heats the mixture to approximately 300° F.;
   (d) extruding the heated mixture from step (c) through a die thereby producing pellets of the mixture;
   (e) spraying the remaining 25% portion of the liquid animal fat on the pellets from step (d); and then
   (f) cooling the sprayed pellets to produce a cattle feed.

2. The process of claim 1, wherein the die is 5/16 of an inch in diameter.

3. The process of claim 1, wherein the pellets are cooled for about 20 to 25 minutes.

4. A process according to claim 1, wherein said liquid animal fat is the only form of animal fat used to produce the cattle feed.

5. A process according to claim 1, wherein said cattle feed ingredients comprises approximately 800 pounds of meat and bone, 100 pounds of bloodmeal, 300 pounds of soy hulls, 400 pounds of corn and 400 pounds of liquid animal fat.

6. A process according to claim 1, wherein said cattle feed ingredients comprise about 40% by weight meat and bone, about 5% by weight bloodmeal, about 15% by weight soy hulls, about 20% by weight corn and about 20% by weight liquid animal fat.

7. A process for producing a cattle feed according to claim 1, wherein said cattle feed ingredients comprise about 760-850 pounds of meat and bone, about 75-125% pounds of bloodmeal, about 275-325 pounds of soy hulls, about 400-450 pounds of corn, and about 400-410 pounds of liquid animal fat.

* * * * *